United States Patent

Günther et al.

[11] Patent Number: 4,968,798
[45] Date of Patent: Nov. 6, 1990

[54] LIQUID-CRYSTALLINE, 1-SUBSTITUTED PIPERIDINE-4-CARBOXYLIC ACID ESTERS

[75] Inventors: Dieter Günther, Kelkheim; Dieter Ohlendorf, Liederbach; Rainer Wingen, Hattersheim am Main, all of Fed. Rep. of Germany

[73] Assignee: Hoechst Aktiengesellschaft, Frankfurt am Main, Fed. Rep. of Germany

[21] Appl. No.: 289,229

[22] Filed: Dec. 22, 1988

[30] Foreign Application Priority Data

Dec. 24, 1987 [DE] Fed. Rep. of Germany ....... 3744024

[51] Int. Cl.$^5$ .................. C07D 211/30; C07D 401/10; C07D 401/08; C07D 403/10
[52] U.S. Cl. .................................... 544/316; 546/226; 546/227; 546/193; 546/194; 544/224; 544/239; 544/240; 544/319; 544/335
[58] Field of Search ............... 546/226, 227, 193, 194; 544/224, 316

[56] References Cited

U.S. PATENT DOCUMENTS 4,594,343 6/1986 Shanklin et al. .................... 546/226

Primary Examiner—John M. Ford
Attorney, Agent, or Firm—Curtis, Morris & Safford

[57] ABSTRACT

Liquid-crystalline, 1-substituted piperidine-4-carboxylic acid esters, process for their preparation, and their use in liquid-crystalline mixtures The novel 1-substituted piperidine-4-carboxylic acid esters of the general formula (I)

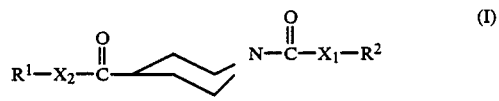

are liquid-crystalline and exhibit, in particular, $S_c$ or $S_c^*$ phases. In this formula, $R^1$ or $R^2$ is a radical of the general formula (II)

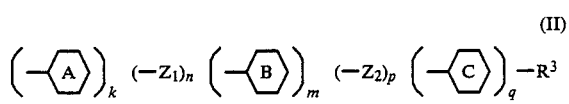

in which the rings are aromatic, heteroaromatic or optionally heteratom-containing cycloaliphatic molecular components, such as 1,4-phenylene, pyrimidine-2,5-diyl or trans-1,4-cyclohexylene, which are linked via a single bond (in the case where n and p=zero) or via functional groups $Z_1$ or $Z_2$ such as CO- or $CH_2$-O, and in which k, n, m, p and q are zero or 1, where k+m+p is at least 1 and p=zero when m=zero. The other radical $R^1$ or $R^2$ is an optionally substituted straight-chain or branched alkyl group having 1 to 20 carbon atoms, $X_1$ denotes, S, phenylenoxy or $CH_2$, and $X_2$ denotes O or phenylenoxy.

3 Claims, No Drawings

LIQUID-CRYSTALLINE, 1-SUBSTITUTED PIPERIDINE-4-CARBOXYLIC ACID ESTERS

Liquid crystals have recently been introduced into a very wide variety of industrial areas in which electro-optical and display device properties are in demand (for example in displays for watches, pocket calculators and typewriters). These display devices are based on dielectric alignment effects in the nematic, cholesteric and/or smectic phases of the liquid-crystalline compounds, the longitudinal molecular axis of the compounds adopting a preferred alignment in an applied electrical field-caused by the dielectric anisotropy. The customary switching times in these display devices are rather too slow for many other potential areas of application of liquid crystals, which are per se very promising chemical compounds for industry due to their unique properties. This disadvantage becomes particularly noticeable when which is necessarily the case in relatively large display element areas - it is necessary to address a large number of image points, which causes the production costs of equipment of this type containing these relatively large areas, such as video recorders, oscillographs or TV, radar, EDP or word processor screens, to be too high.

Besides nematic and cholesteric liquid crystals, tilted smectic liquid-crystal phases have also become increasingly important in the last few years for practical applications.

Clark and Lagerwall have been able to show that the use of such liquid-crystal systems in very thin cells results in optoelectrical display elements which have switching times that are faster by a factor of about 1000 than conventional TN ("twisted nematic") cells (cf. for example, Lagerwall et al. "Ferroelectric Liquid Crystals for Displays", SID Symposium, October Meeting 1985, San Diego, Ca., USA). Due to these and other favorable properties, for example the possibility for bistable switching and the contrast which is virtually independent of the viewing angle, FLCs are in principle highly suitable for the above mentioned areas of application, for example via matrix addressing.

For practical use of ferroelectric liquid crystals in optoelectrical displays, chirally tilted, smectic phases, for example $S_c^*$ phases, are now required (R. B. Meyer, L. Liebert, Strzelecki, P. Keller, J. Physique 36, L-69 (1975)), which are stable over a broad temperature range. This aim can be achieved by means of compounds which themselves form chiral smectic phases, for example $S_c^*$ phases, or alternatively by doping compounds which form non-chiral, tilted smectic phases with optically active compounds (M. Brunet, C. Williams, Ann. Phys. 3, 237 (1978)).

There is therefore a demand for compounds which form smectic phases or can be prepared with the aid of mixtures thereof with smectic, in particular $S_c$ or $S_c^*$, phases and which are at the same time "compatible" with many further components in liquid-crystalline mixtures. This object is achieved by the liquid-crystalline, 1-substituted piperidine-4-carboxylic acid esters of the general formula (I)

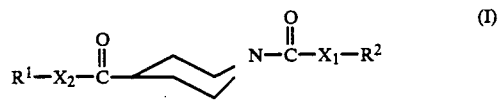

in which $R^1$ or $R^2$ denotes a radical of the general formula (II)

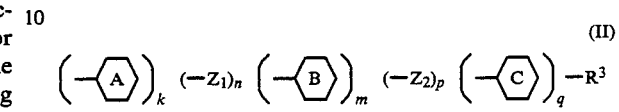

and, in addition, the substituents, components and indices have the following meaning:

k, n, m, p, q are zero or 1, but =zero when m=zero and k+m+q is at least 1, $z_1$ is CO—O, O—CO, $(CH_2)_2$, $OCH_2$, $CH_2O$, CO—S, S—CO $Z_2$ is $Z_1$ or $CH_2$, N=N or N=N(O)

$X_1$ is O, S or $CH_2$ or phenyleneoxy (in the case where $R^1$=(II))

$X_2$ is O or phenyleneoxy (in the case where $R^2$=(II))

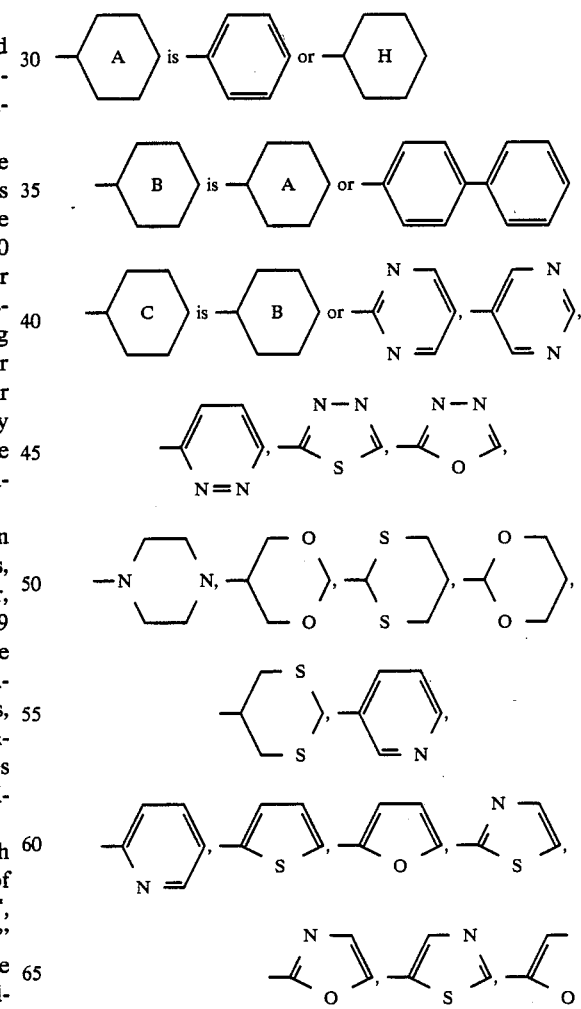

and $R^3$ is $C_rH_{2r+1}$, $O-C_rH_{2r+1}$, $S-C_rH_{2r+a}$, $CO-C_rH_{2r+1}$, $O-CO-C_rH_{2r+1}$ or $CO-O-C_rH_{2r+1}$, where r is an integer from 1 to 20, and in which the radical $R^1$ or $R^2$, which is not expressed by the general formula (II), denotes a straight-chain or branched alkyl group having 1 to 20 carbon atoms which is unsubstituted or substituted by F, Cl, Br or CN and in which one or two non-adjacent —CH$_2$— groups may be replaced by —O—, —S—, —CO—, —O—CO—, —CO—O—, —O—CS—, —CO—S— —and/or —CH=CH—, or which contains a terminal group

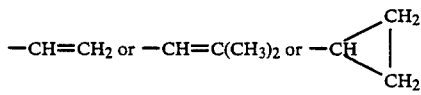

or an optically active group containing a chiral component from the group comprising

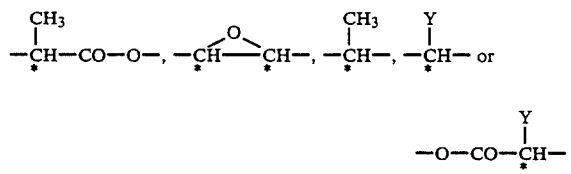

where Y = F, Cl, Br or CN.

Of the compounds according to the invention, those are preferred in which, in the general formulae (I) and (II), the substitutents, components and indices have the following meaning: in the case where k and n = zero, m, p and q = zero or 1 and m+q is at least 1, $Z_2$=CO—O, O—CO or CH$_2$, $X_1$=O, CH$_2$ or phenylkeneoxy (in the case where

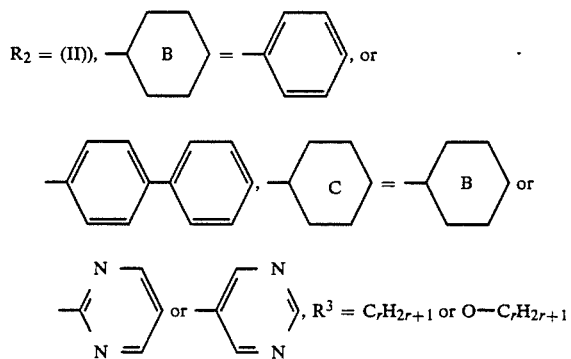

where r=4 to 15; in particular, the general formula (II) denotes

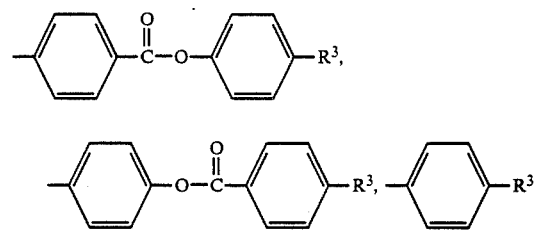

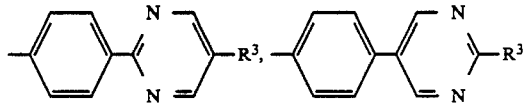

and the radical $R^1$ or $R^2$, which is not expressed by (II), denotes a straight-chain or branched alkyl group having 2 to 15 carbon atoms in which one —CH$_2$—group may be replaced by —O—, —S—, —CO—O—or —O—CO—or contains an optically active group containing a chiral component from the group comprising

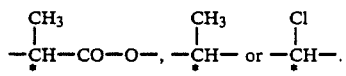

To prepare the compounds of the general formula (I), piperidine-4-carboxylic acid which is protected on the nitrogen is esterified in a manner known per se using the appropriate phenol or alcohol, in the presence of Brönstedt or Lewis acids, if appropriate in the presence of waterbinding agents and/or with the aid of condensation agents such as N,N'-carbonyldiimidazole or dicyclohexylcarbodiimide.

The N-acylation, as a substitution in the 1-position, takes place, after removal of the protecting group, either using the appropriate carboxylic acids or acyl chlorides in the presence of dicyclohexylcarbodiimide or organic bases such as pyridine or triethylamine, or using chloroformic acid derivatives, which are obtained by reacting the appropriate phenols or alcohols with phosgene, diphosgene or triphosgene. The starting compounds required for these reactions, for example mesogenic phenols or hydroxyheterocyclic compounds, can be synthesised by processes known from the literature (for example B. H. Zaschke et al., Z. Chem. 17, 293 (1977); M. E. Neubert et al., Mol. Cryst. Liq. Crist. 154, 117 (1987), J. W. Goodby, E. Chin, Mol. Cryst. Liq. Cryst. 141, 311 (1986)).

The piperidine-4-carboxylic acid esters according to the invention form liquid-crystal phases in liquid-crystal mixtures. The term "liquid-crystal phase" is taken to mean nematic, cholesteric, smectic or tilted smectic, in particular $S_c$ and/or $S_c^*$, phases. The liquid-crystal mixtures comprise 2 to 20, preferably 2 to 15 components, including at least one of the compounds claimed according to the invention.

The other components are preferably selected from known compounds having nematic, cholesteric, smectic and/or tilted smectic phases; these include, for example, Schiff bases, biphenyls, terphenyls, phenylcyclohexanes, cyclohexylbiphenyls, N-, S- or O-containing heterocyclic compounds, for example pyrimidines, cinnamic acid esters, cholesterol esters, and various bridged, terminal-polar polynuclear esters of p-alkylbenzoic acids. In general, the commercially available liquid-crystal mixtures, even before addition of the compound(s) according to the invention, are in the form of mixtures of a very wide variety of components, of which at least one is mesogenic, i.e., as the compound, in derivatized form, or mixed with certain components, exhibits a liquid-crystal phase which arouses expectations of at least one enantiotropic (clear point >melting point) or monotropic (clear point <melting point) mesophase formation.

In particular, the liquid-crystal mixture contains, in addition to at least one of the compounds claimed according to the invention, an ester compound having an $S_c$ phase, for example a phenyl alkoxybenzoate, or a biaromatic compound containing a nitrogen-containing hetercyclic ring, for example an alkylpyrimidinylalkoxybenzene and/or an optically active compound which is capable of inducing an $S_c^*$ or cholesteric phase in the mixture.

The liquid-crystal mixtures generally contain 0.05 to 80% by weight, in particular 0.1 to 60% by weight, of the compound(s) according to the invention.

The compounds according to the invention can readily be processed to mixtures with many of the components mentioned. In addition, they can be prepared in great variety and in good yields from the starting substance, which is also commercially available in relatively large amounts.

In the examples below, parts by weight are to parts by volume as the kilogram is to the liter; unless otherwise stated, indications of % relate to the weight.

EXAMPLE 1

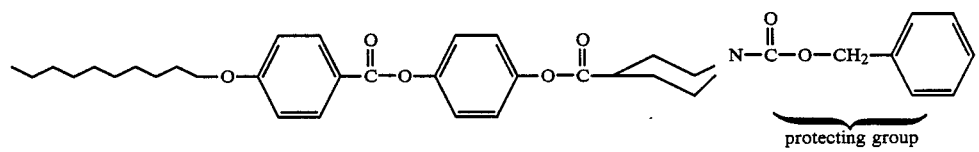

4-(4-decyloxybenzoyl)oxyphenyl 1-carbobenzoxypiperidine-4-carboxylate 34 parts by weight of carbobenzoxypiperidine-4-carboxylic acid and 48 parts by weight of 4-(4-decyloxybenzoyloxy)phenol are dissolved in 600 parts by volume of methylene chloride; 2 parts by weight of 4-pyrrolidinopyridine and 31 parts by weight of dicyclohexylcarbodiimide are added, and the mixture is stirred at 0 to 5° C. for 25 hours. Precipitated dicyclohexylurea is filtered off under suction (29 parts by weight). The solvent is stripped off in vacuo, and the residue comprises 88.5 parts by weight of crude product. After recrystallization from 100 parts by volume of ethanol, 67 parts by weight of white crystals of melting point 79 to 80° C. are obtained.

4-(4-decyloxybenzoyl)oxyphenyl 1-n-octanoylpiperidine-4-carboxylate 3.7 parts by weight of the above compound are stirred at room temperature with 5 parts by volume of glacial acetic acid and 5 parts by volume of glacial acetic acid/HBr (33% strength), until evolution of carbon dioxide has ceased (about 1 hour). 70 parts by volume of diisopropyl ether are added, the mixture is stirred for 2 hours, the precipitated product is filtered off under suction and washed with diisopropyl ether, and the still-moist residue is dissolved in 80 parts by volume of methylene chloride. 0.98 parts by weight of octanoyl chloride is added to the solution, which is then cooled to 0 to 5° C. under nitrogen. 2 parts by volume of triethylamine in 8 parts by volume of methylene chloride are then added slowly, and the mixture is stirred at 5° C. for 15 minutes and at room temperature for 1.5 hours. The solvent is stripped off in vacuo; 5.4 parts by weight of residue remain. The residue is chromatographed on a column (240 parts by weight of silica gel, eluent $CH_2Cl_2 + 10\%$ of methanol). A fraction is obtained which, after stripping of the solvent, gives 3.2 parts by weight of product. After recrystallizing twice from methanol, 2.7 parts by weight of the compound remain as colorless crystals. C 65 $S_X$ 88 $S_c$ 110 $S_A$ 125 I The compounds below are obtained analogously (Examples 2 to 17):

EXAMPLE 2

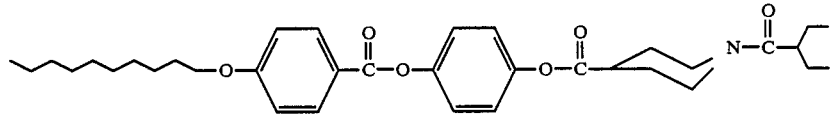

4-(4-decyloxybenzoyl)oxyphenyl 1-(2-ethylbutyroyl)-piperidine-4-carboxylate C 74 N 89.5 I (I 89 N 65.5 $S_A$ 42 $S_c$ 39 C)

EXAMPLE 3

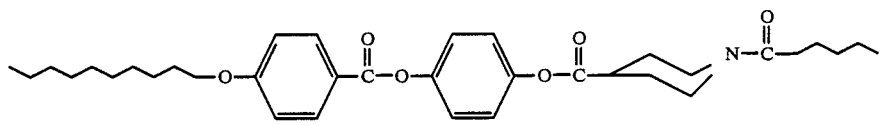

4-(4-decyloxybenzoyl)oxyphenyl 1-hexanoylpiperidine-4-carboxylate C 52 SX 86 SA 120 I

EXAMPLE 4

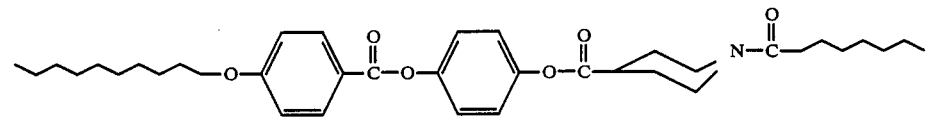

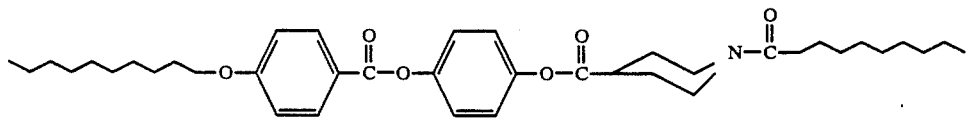

4-(4-decyloxybenzoyl)oxyphenyl 1-decanoylpiperidine-4-carboxylate C 74 SB 89.9 S$_c$ 124 SA 126.9 I

EXAMPLE 5

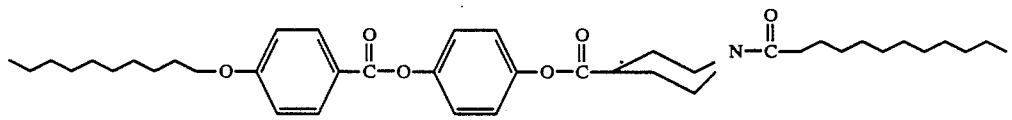

4(4-decyloxybenzoyl)oxyphenyl 1-dodecanoylpiperidine-4-carboxylate C 93 S$_c$ 127.5 I

EXAMPLE 6

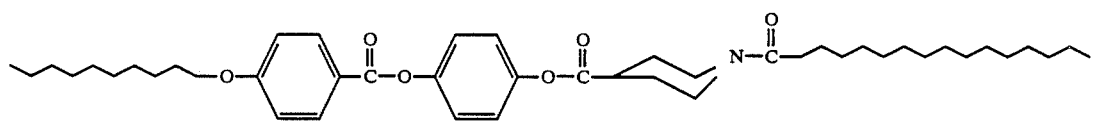

4(4-decyloxybenzoyl)oxyphenyl 1-palmitoylpiperidine-4-carboxylate C 93 S$_c$ 129 I

EXAMPLE 7

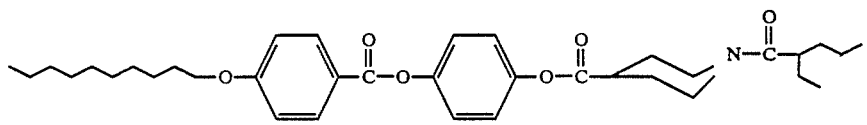

4-(4-decyloxybenzoyl)oxyphenyl 1-(2-ethylpentanoyl)-piperidine-4-carboxylate C 53 N 76 I

EXAMPLE 8

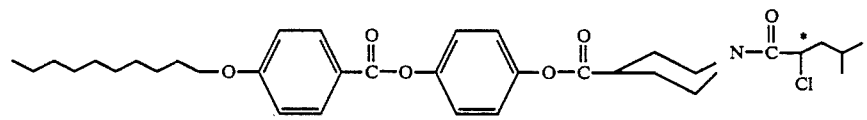

4(4-decyloxybenzoyl)oxyphenyl 1-[(S)-2-chloro-4-methylpentanoyl]piperidine-4-carboxylate
$[\alpha]_D^{21}: +14.1$ (c = 1; CH$_2$Cl$_2$) Melting point 109° C. (I 97 SA 77 S$_c$ 68 C)

Measurement method: if a small amount of a chiral compound is added to a (non-chiral) solvent, the plane of linear-polarised light is rotated by the (characteristic) angle α; this angle is specified as follows: $[\alpha_D^T(c = x,$ solv.), where the symbols have the following meaning: x = concentration of the solution in g/l, solv. = solvent, D = 589 nm (AND line), T = temperature of the solution. The angle of rotation is determined in a polarimeter at a cell path length of 10 cm.

EXAMPLE 9

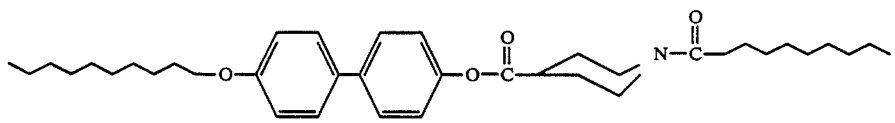

4'-decyloxybiphenyl-4-yl 1-decanoylpiperidine-4-carboxylate C 87 SB 132 SA 140 I

EXAMPLE 10

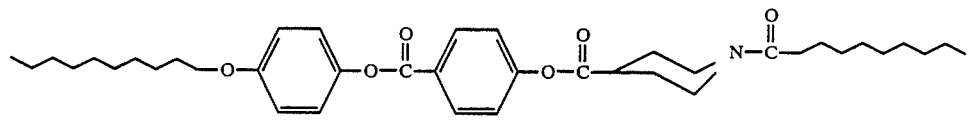

4(4-decyloxyphenyloxy)benzoyl 1-decanoylpiperidine-4-carboxylate C 102 SA 142 I

EXAMPLE 11

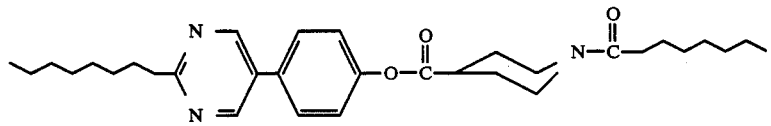

4-(2-octylpyrimidin-5-yl)phenyl 1-octanoylpiperidine-4-carboxylate C 75 SX 82.5 S$_c$ 88 I

EXAMPLE 12

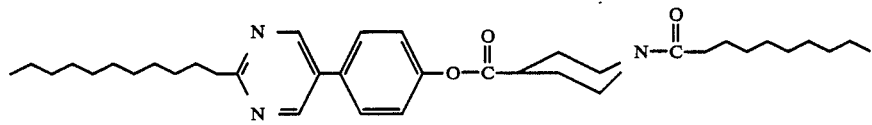

4-(2-undecylpyrimidin-5-yl)phenyl 1-decanoylpiperidine-carboxylate C 90 S$_c$ 102 I

EXAMPLE 13

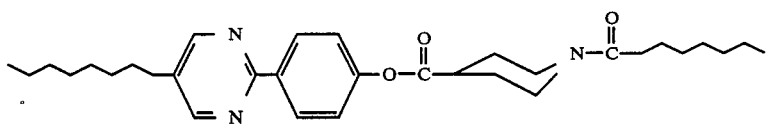

4-(2-undecylpyrimidin-5-yl)phenyl 1-palmitoylpiperidine-4-carboxylate C 82 S$_c$ 102 I

EXAMPLE 14

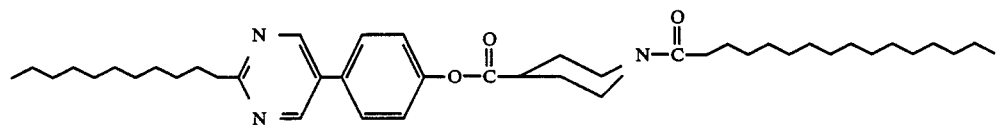

4-(5-octylpyrimidin-2-yl)phenyl 1-propionylpiperidine-4-carboxylate Melting point 75° C.

EXAMPLE 15

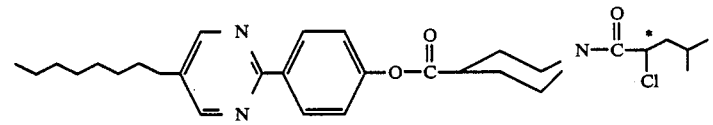

4-(5-octylpyrimidin-2-yl)phenyl 1-[(S)-2-chloro-4-methylpentanoyl]piperidine-4-carboxylate Melting point 96° C. $[\alpha]_D^{23:}$ +16.5 (c = 1; CH$_2$Cl$_2$)

EXAMPLE 16

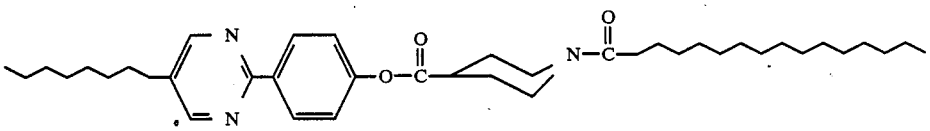

4-(5-octylpyrimidin-2-yl)phenyl 1-octanoylpiperidine-4-carboxylate Melting point 100° C. (I 87 SX 60 C)

EXAMPLE 17

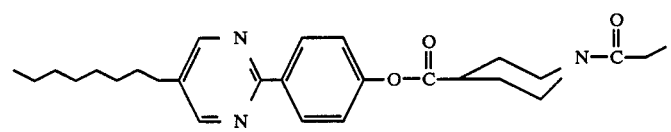

4-(5-octylpyrimidin-2-yl)phenyl 1-palmitoylpiperidine-4-carboxylate C 90 SX 95 S$_c$ 96.6 I

EXAMPLE 18

The procedure followed is as in Example 1, but the reaction component alkanoyl chloride is replaced by the appropriate chloroformic acid ester.

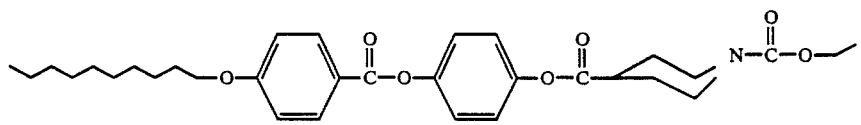

4(4-decyloxybenzoyl)oxyphenyl 1-ethoxycarbonyl-piperidine-4-carboxylate C 75 $S_c$ 87 N 90 I The compounds below (Examples 19 to 29) are obtained analogously:

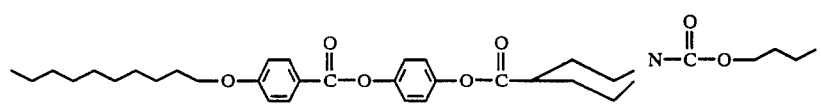

EXAMPLE 19

4(4-decyloxybenzoyl)oxyphenyl 1-butoxycarbonyl-piperidine-4-carboxylate C 45 SB 51.4 $S_c$ 79.2 SA 83.6 I

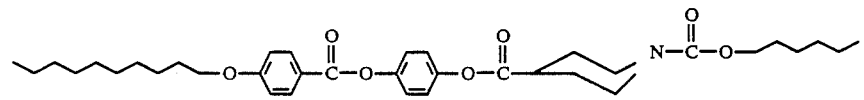

EXAMPLE 20

4(4-decyloxybenzoyl)oxyphenyl 1-hexyloxycarbonyl-piperidine-4-carboxylate C 40 SX 47.5 $S_c$ 78.5 I

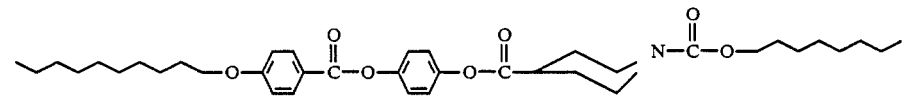

EXAMPLE 21

4(4-decyloxybenzoyl)oxyphenyl 1-octyloxycarbonyl-piperidine-4-carboxylate C 68 $S_c$ 81.6 I

EXAMPLE 22

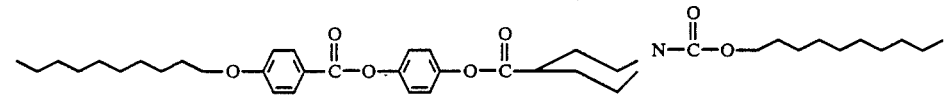

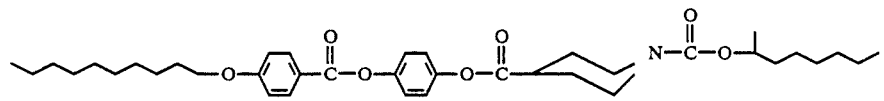

4(4-decyloxybenzoyl)oxyphenyl 1-decyloxycarbonyl-piperi-dine-4-carboxylate C 62 SX 73.8 $S_c$ 83.3 I

EXAMPLE 23

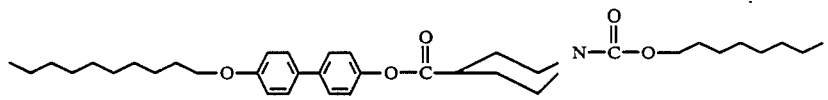

4(4-decyloxybenzoyl)oxyphenyl 1-[(S)-1-methylheptyl]-oxycarbonylpiperidine-4-carboxylate $[\alpha]_d^{25}$: +10.8 (c =1; $CH_2Cl_2$) C 53.5 SA 63 I

EXAMPLE 24

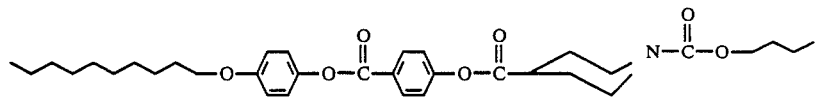

4'-decyloxybiphenyl-4-yl 1-octyloxycarbonylpiperi-dine-4-carboxylate C 87 SX 102 I

EXAMPLE 25

4(4-decyloxyphenyloxy)benzoyl 1-butoxycarbonyl-piperidine-4-carboxylate C 80 SA 103 I (I 103 SA 65 $S_c$ 53 I)

EXAMPLE 26

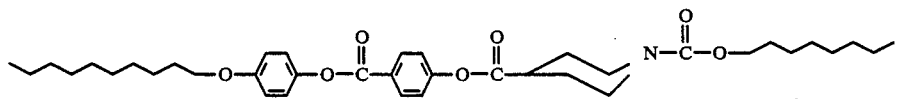

4-(4-decyloxyphenyloxy)benzoyl 1-octyloxycarbonyl-piperidine-carboxylate C 80.3 S_c 81.4 SA 94 I

EXAMPLE 27

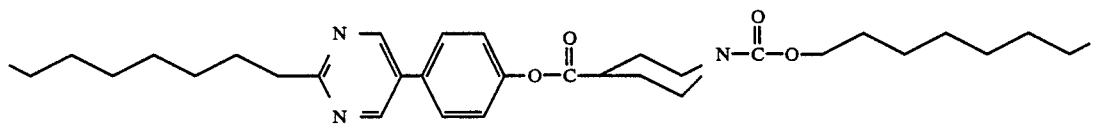

4-(2-octylpyrimidin-5-yl-phenyl 1-octyloxycarbonyl-piperidine-4-carboxylate
Melting point 68° C. (I 64 SA 63.3 S_c 62 SX 60 C)

EXAMPLE 28

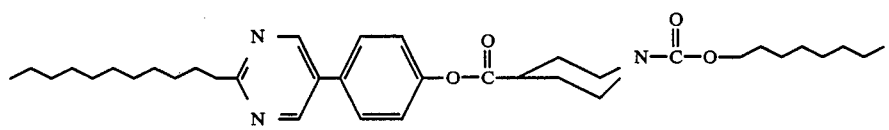

4-(2-undecylpyrimidin-5-yl)phenyl 1-octyloxycarbonyl-piperidine-4-carboxylate
Melting point: 74° C. (I 74 S_c 72 SX 69 C)

EXAMPLE 29

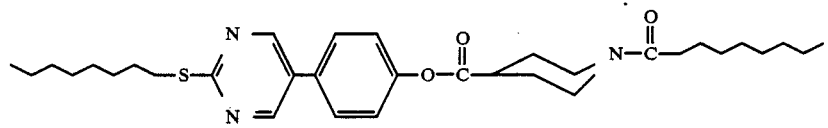

4-(2-octylthiopyrimidin-5-yl)phenyl 1-octyloxycarbonyl-piperidine-4-carboxylate
Melting point: 82° C.

EXAMPLE 30

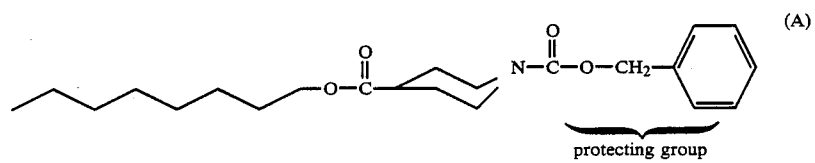

Octyl 1-carbobenzoxypiperidine-4-carboxylate =(A)
13.2 parts by weight of 1-carbobenzoxypiperidine-4-carboxylic acid are dissolved in 150 parts by volume of methylene chloride, 8 parts by volume of n-octanol and 0.7 part by weight of 4-pyrrolidinopyridine are added, and the mixture is cooled to 0 to 5° C. 12.0 parts by weight of dicyclohexylcarbodiimide are added, and the mixture is stirred at 5° C. for 2 hours and at room temperature for 4 hours. The mixture is left to stand overnight, the precipitated dicyclohexylurea is filtered off with suction (11.3 parts by weight), the solvent is stripped off in vacuo, the residue is stirred with diisopropyl ether in order to remove residual dicyclohexylurea and filtered, and the solvent is stripped off. 21 parts by weight of an oily residue are obtained. The residue is chromatographed on 1070 parts by weight of silica gel using CH_2Cl_2/5% of methanol. 9.8 parts by weight of the compound (A) are obtained as an oil.

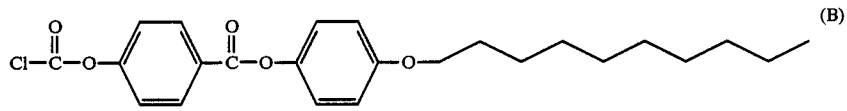

4-decyloxyphenoxy(4-benzoyl) chloroformate =(B)
50 parts by volume of methylene chloride and 1.14 parts by volume of N,N-dimethylaniline are added to 2.25 parts by weight of 4-decyloxyphenyl 4-hydroxybenzoate. 1.02 parts by volume of diphosgene are added with stirring. The blue solution is left to stand overnight at room temperature and is subsequently evaporated in a water-pump vacuum. 3.85 parts by weight of (B) are obtained as a solid residue.

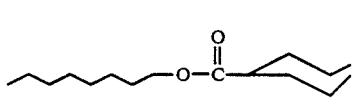
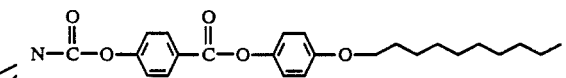

(C)

Octyl 1-[4-decyloxyphenoxy(4-benzoyloxy)]carbonyl-piperidine-4-carboxylate =1C )

3 parts by volume of glacial acetic acid and 3 parts by volume of glacial acetic acid/HBr (33% strength) are added to 1.5 parts by weight of (A), and the mixture is stirred at room temperature for 1 hour ($CO_2$ evolution).

tallization from 15 parts by volume, this gives 0.45 part by weight of (C). Melting point 66–68° C. (I 62 N 57 C)

The compounds below (Examples 31 to 39) are prepared analogously:

EXAMPLE 31

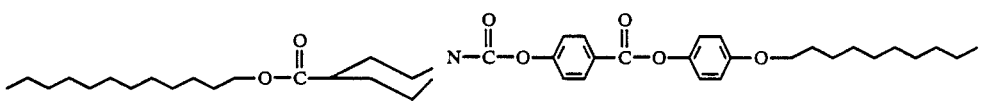

The solvent is stripped off, initially on a water pump, then at about 1 mbar; 1.5 g of a yellow oil remain as an intermediate compound, which is then dissolved in 25 parts by volume of methylene chloride and combined with a solution of 1.6 parts by weight of (B) in 25 parts by volume of methylene chloride, and the mixture is cooled to 0° C. Under nitrogen, 1.4 parts by volume of triethylamine in 4 parts by volume of methylene chloride are then slowly added dropwise. The mixture is subsequently stirred at 0° C. for 15 minutes and at room temperature for 2 hours. The solution is washed by shaking with 20 parts by volume of 1 N hydrochloric acid and twice with water. After drying over magnesium sulphate, the organic phase is filtered and the solvent is stripped off in vacuo. 1.7 parts by weight of (C) are obtained as a solid residue, which is chromatographed over 180 parts by weight of silica gel using methylene chloride/3% of methanol. A homogeneous fraction of 0.55 parts by weight is obtained; after recrys- Dodecyl 1-[4-decyloxy-phenoxy-(4-benzoyloxy]carbonyl-piperidine-4-carboxylate Melting point 70–72° C. (I 69 S 54 C)

EXAMPLE 32

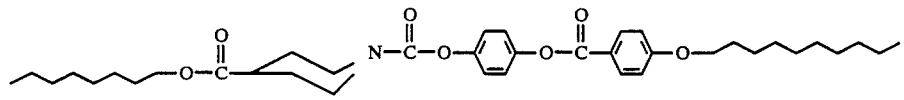

Octyl 1-[4(4-decyloxybenzoyloxy)phenoxy]carbonyl-piperidine-4-carboxylate Melting point 64° C. (I 57 N 47 $S_c$ 35 C)

EXAMPLE 33

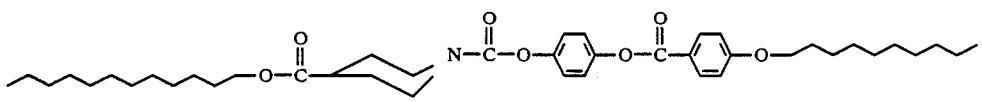

Dodecyl 1-[4(4-decyloxybenzoyloxy)phenoxy]carbonyl-piperidine-4-carboxylate Melting point 73° C. (I 68 N 60 $S_c$ 50 C)

EXAMPLE 34

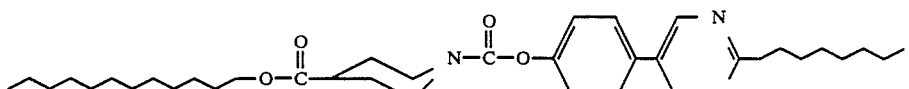

Dodecyl 1-[4-(2-octylpyrimidin-5-yl)phenoxy]carbonyl-piperidine-4-carboxylate Melting point 87° C. (I 86 S 54 C)

EXAMPLE 35

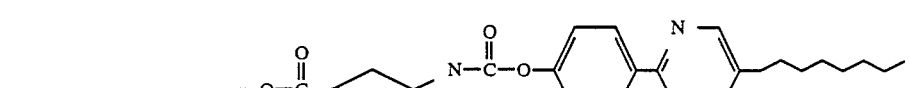

Dodecyl 1-[4-(5-octylpyrimidin-2-yl)phenynoxy]carbonyl-piperidine-4-carboxylate Melting point 76° C.

EXAMPLE 36

(4-dodecyloxy)phenyl 1-(4-dodecyloxy)phenyloxycarbonyl-piperidine-4-carboxylate
Melting point 97° C. (I 89 $S_c$ 87.5 C)

EXAMPLE 37

(4-dodecyloxy)phenyl 1-[4-<(S)-1-ethoxycarbonylethoxy>-phenyl]oxycarbonylpiperidine-2-carboxylate
Melting point 54° C.
$[\alpha]_D^{21} = -19.2°$ (c =1; $CH_2Cl_2$)

EXAMPLE 38

4-<(S)-1-ethoxycarbonylethoxy>]phenyl 1-(dodecyloxy)-phenyloxycarbonylpiperidine-4-carboxylate Melting point 46° C.
$[\alpha]_D^{21} = -19.5$ (c =1; $CH_2Cl_2$)

EXAMPLE 39

(4-decyloxy)phenyl 1-(4-decyloxyphenacetyl)piperidine-4-carboxylate C 102 $S_A$ 105 I

I claim:
1. A liquid-crystalline, 1-substituted piperidine-4-carboxylic acid ester of the formula (I),

(I)

in which $X_1$ is O, $CH_2$ or phenyleneoxy (in the case where $R^1=(II)$)
$X_2$ is O or phenyleneoxy (in the case of $R^2=(II)$) and in which $R^1$ and $R^2$ are: a radical of the formula (II)

(II)

wherein:
k, n, m, p, q are zero or 1, but p=zero when m=zero and k+m+q is at least 1,
$Z_1$ is CO—O, O—CO, $(CH_2)_2$, $OCH_2$ or $CH_2O$,
$Z_2$ is $Z_1$ or $CH_2$, —A— is phenyl or H (cyclohexyl), —B— is —A— or biphenyl, —C— is —B— or pyrazine/pyridazine, pyridazinyl, pyridinyl or pyrimidinyl, $R^3$ is $C_rH_{2r+1}$, $O-C_rH_{2r+1}$, $S-C_rH_{2r+1}$, $CO-C_rH_{2r+1}$, $O-CO-C_rH_{2r+1}$ or $CO-O-/C_rH_{2r+1}$, where r is an integer from 1 to 20,
or a straight-chain or branched alkyl group having 1 or 20 carbon atoms which alkyl is unsubstituted or substituted by F, Cl, Br, or CN and in which one —$CH_2$—group may be replaced by —O—, —S—, —CO—, —O—CO—, —CO—O— or —CH=CH—, or which contains a chiral component from the group comprising $$-\overset{*}{\underset{CH_3}{CH}}-CO-O-,\quad -\underset{}{CH}\overset{O}{\underset{}{\diagdown}}\underset{}{CH}-,\quad -\overset{CH_3}{\underset{*}{CH}}-,$$

$$-\overset{Y}{\underset{*}{CH}}-\quad \text{or}\quad -O-CO-\overset{Y}{\underset{*}{CH}}-$$

where Y=F, Cl, Br or CN.

2. A liquid-crystalline ester as claimed in claim 1, wherein in the fomrula (II) k and n =zero, m, p and q =zero or 1 and m+q is at least 1, $Z_2$=CO—O, O—CO or $CH_2$,

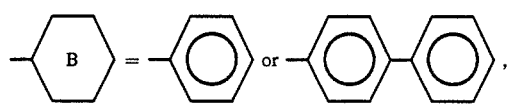

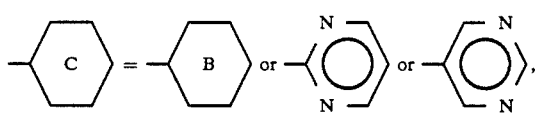

$R_3 = C_rH_{2r+1}$ or $O-C_rH_{2r+1}$ where r=4 to 15.

3. A liquid-crystalline ester as claimed in claim 2 wherein the radical of the formula (II) is:

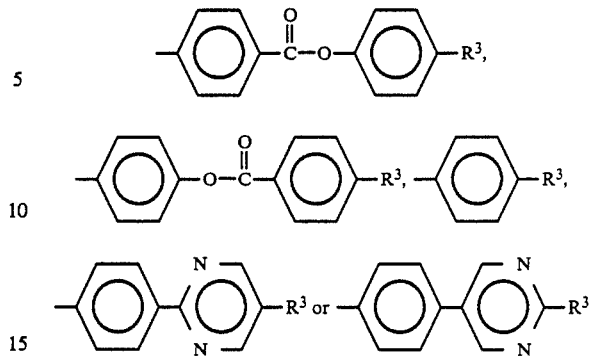

and wherein $R^1$ and $R^2$ are a radical of the formula (II) or are a straight-chain or branched alkyl group having 2 to 15 carbon atoms in which one —$CH_2$—group may be replaced by —O—, —S—, —CO—O—or —O—CO—or which contains an optically active group containing a chiral component from the group comprising

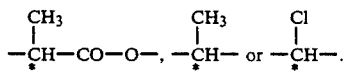

* * * * *